(12) United States Patent
Pichumani et al.

(10) Patent No.: US 9,264,471 B2
(45) Date of Patent: Feb. 16, 2016

(54) METHOD AND APPARATUS FOR SEGMENTING MEDIA CONTENT

(75) Inventors: Padmagowri Pichumani, Bangalore (IN); Padmassri Chandrashekar, Bangalore (IN); Shailesh Ramamurthy, Bangalore (IN)

(73) Assignee: Google Technology Holdings LLC, Mountain View, CA (US)

( * ) Notice: Subject to any disclaimer, the term of this patent is extended or adjusted under 35 U.S.C. 154(b) by 283 days.

(21) Appl. No.: 13/166,505

(22) Filed: Jun. 22, 2011

(65) Prior Publication Data

US 2012/0330950 A1 Dec. 27, 2012

(51) Int. Cl.
*G06F 17/30* (2006.01)
*H04L 29/06* (2006.01)
*H04N 21/482* (2011.01)
*H04N 21/845* (2011.01)

(52) U.S. Cl.
CPC .......... *H04L 65/4076* (2013.01); *H04L 65/604* (2013.01); *H04L 65/607* (2013.01); *H04N 21/4828* (2013.01); *H04N 21/8456* (2013.01)

(58) Field of Classification Search
CPC .................. H04L 65/4076; H04N 21/8456
USPC ........................................................ 707/602
See application file for complete search history.

(56) References Cited

U.S. PATENT DOCUMENTS

| 7,770,201 | B2 | 8/2010 | Fries |
| 7,774,817 | B2 | 8/2010 | Gupta |
| 2002/0009285 | A1 | 1/2002 | Safadi et al. |
| 2006/0188228 | A1 | 8/2006 | Nakamura et al. |
| 2006/0203916 | A1 | 9/2006 | Chandramouly |
| 2007/0113243 | A1* | 5/2007 | Brey ................................. 725/32 |
| 2008/0112690 | A1* | 5/2008 | Shahraray et al. ............ 386/124 |
| 2008/0126919 | A1 | 5/2008 | Uskali et al. |

(Continued)

FOREIGN PATENT DOCUMENTS

| EP | 1262063 B1 | 11/2007 |
| WO | 2006128242 A1 | 12/2006 |

OTHER PUBLICATIONS

Zihao Yu, "Time-based Alignment of Video Recordings: A Service and an Application", Master's Thesis, Rutgers, The State University of New Jersey, 2011.

(Continued)

*Primary Examiner* — Baoquoc To
(74) *Attorney, Agent, or Firm* — Fenwick & West LLP

(57) ABSTRACT

To create information in media content a standardized segment tag associated with macro segments is created. To extract segments from media content, macro segments of the contiguous stream are identified based on the presence of a standardized segment tag associated with each identified segment and data is extracted from each identified segment based on the associated tag. In a device for creating information in media content, a processor identifies macro segments of the contiguous stream and creates a standardized segment tag associated with each segment. A memory stores the macro segments and the standardized tag associated with each segment. A device for extracting segments includes a processor configured to identify macro segments of the contiguous stream based on the presence of a standardized segment tag associated with each segment. The processor extracts data from each identified macro segment based on the associated standardized tag. A memory stores the extracted data.

13 Claims, 8 Drawing Sheets

(56) References Cited

U.S. PATENT DOCUMENTS

| | | |
|---|---|---|
| 2008/0148138 A1 | 6/2008 | Sparrell |
| 2008/0175556 A1 | 7/2008 | Dorai et al. |
| 2008/0222201 A1 | 9/2008 | Chen et al. |
| 2008/0281592 A1 | 11/2008 | McKoen et al. |
| 2008/0286739 A1 | 11/2008 | Umrigar et al. |
| 2008/0307481 A1 | 12/2008 | Panje |
| 2009/0016622 A1* | 1/2009 | Itakura ............ 382/236 |
| 2009/0055383 A1 | 2/2009 | Zalewski |
| 2009/0205000 A1* | 8/2009 | Christensen et al. ........... 725/61 |
| 2009/0210226 A1* | 8/2009 | Ma .............. 704/236 |
| 2010/0125879 A1 | 5/2010 | Peterka et al. |
| 2010/0162289 A1 | 6/2010 | Sanders |
| 2010/0287473 A1 | 11/2010 | Recesso et al. |
| 2010/0325657 A1 | 12/2010 | Sellers et al. |
| 2011/0075841 A1 | 3/2011 | Chen et al. |
| 2011/0134991 A1 | 6/2011 | Gregotski et al. |
| 2014/0095293 A1* | 4/2014 | Abhyanker ................ 705/14.41 |

OTHER PUBLICATIONS

M. Hausenblas, et al., "Deploying Multimedia Metadata on theSemantic Web", in Posters and Demos Session, 2nd International Conference on Semantic and Digital Media Technologies (SAMT), Genoa, Italy (2007).

Related Content Database, Inc., "RCDb and Gracenote Team Up to Bring Rich Movie, TV and Music Data to the Cable Experience", Press Release, May 2010.

Related Content Database, Inc., "RCDb and Alticast Deliver New VOD Features and New Revenue Streams on Cisco Tru2way Platform", Press Release, May 2010.

\* cited by examiner

US 9,264,471 B2

METHOD AND APPARATUS FOR SEGMENTING MEDIA CONTENT

BACKGROUND

Set-top boxes with DVR capability have given the television viewer greater flexibility in the manner in which the viewer watches TV programs. The viewer can record the broadcast program and watch it at a later point in time. A viewer can watch a time shifted version of the same program, and skip portions of the program that are not of interest. However, when it comes to automated mechanisms of filtering the broadcast content and storing and indexing the same, there are certain limitations. Current state-of-the-art systems allow users to specify "programs" as specified in the EPG or to specify a time and channel which they would like to record. In some cases, channels air what could be termed as un-demarcated content, which one can think of, as comprising logical segments, but which do not have associated granular metadata. The notion of the name of these logical segments or the precise time of airing of these segments is not granularized in the stream, for EPG or for any other applications. Hence, it is not currently possible, from such un-demarcated program content, to filter out only those items that the user would be interested in recording and/or storing in an indexed fashion. Therefore there is a need in the art for a solution addressing the above-mentioned shortcomings and enabling several other enhanced user experiences.

SUMMARY

A method for creating information in media content is disclosed. The media content may be defined by a contiguous stream. The contiguous stream may have a plurality of logically disparate macro segments. In one embodiment, one or more macro segments of the contiguous stream are identified. A standardized segment tag associated with of the one or more macro segments is created. In one embodiment, each standardized segment tag is associated with a data set.

The contiguous stream may be on of an audio-video stream, an audio-only stream, or a video-only stream. The contiguous stream may be broadcast content.

In one embodiment, the standardized segment tag is created in media data within picture user data. In one embodiment, the standardized segment tag is created in media data within Supplemental Enhancement Information. In one embodiment, the standardized segment tag is created in media data within a private data stream. In one embodiment, the standardized segment tag is created in media data in an ID3 audio tag.

Creation of the standardized segment tag in media content may be performed by a content creator. Creation of the standardized segment tag in media content may also be performed by a multiple system operator (MSO).

A method for extracting segments from media content is disclosed. The media content is defined by a contiguous stream. In one embodiment, the media content may be a recorded program. The contiguous stream may have a plurality of logically disparate macro segments. In one embodiment one or more macro segments of the contiguous stream are identified based on the presence of a standardized segment tag associated with each macro segment. Data is extracted from each identified macro segment based on the associated standardized segment tag.

In one embodiment, a content object is created. The content object may be at least the tag and the associated macro segment. Content object(s) may be shared with one or more users. One or more tags and data sets may be shared with one or more users. The content object may be created based on a user preference. The content object may be stored in a database. The database may be searched based on the user preference. The creation of the content object may be performed by a multiple system operator (MSO).

In one embodiment, the content object may already be stored in a database. In this embodiment, the database may be searched based on a user preference.

The content object may be a data set associated with each identified macro segment. In one embodiment, using the novel properties of the present disclosure, creation of duplicate content objects is prevented.

The contiguous stream may be one of: an audio-video stream, an audio-only stream, and a video-only stream. The contiguous stream may be broadcast content.

Each standardized segment tag may be associated with a data set. One or more tags and data sets may be shared with one or more users.

In one embodiment, the extraction of macro segments from media content is performed by an end-user device.

In one embodiment, one or more segment tags are shared with one or more users.

In one embodiment, the extraction of macro segments is based on user preference information. In this embodiment, the user preference information may be used to derive information regarding user interests. A device for creating information in media content is disclosed. The media content may be defined by a contiguous stream. The contiguous stream may have a plurality of logically disparate macro segments. In one embodiment a processor is configured to identify one or more macro segments of the contiguous stream. The processor is configured to create a standardized segment tag associated with each of the one or more macro segments. A memory is used to store the one or more macro segments and the standardized segment tag associated with each of the one or more macro segments.

A device for extracting segments of media content is disclosed. The media content may be defined by a contiguous stream. The contiguous stream may have a plurality of logically disparate macro segments. In one embodiment, a processor is configured to identify one or more macro segments of the contiguous stream based on the presence of a standardized segment tag associated with each identified macro segment. The processor is configured to extract data from each identified macro segment based on the associated standardized segment tag. Also disclosed is a memory for storing the extracted data.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

The system of this disclosure identifies and stores logically disparate segments in an audio-video (AV) broadcast, e.g., media content. Broadcast content may be filtered based on user preferences and stored in a classified database allowing the user to browse the stored media content at the user's leisure. Previously stored media content may also be filtered at an end-user device based on user preferences to provide a collection of one or more logically disparate segments. This collection of logically disparate segments and/or tags associated with the segments may be shared with other users. Information related to a given recording may be transferred from the end-user's device via a separate network and/or protocol to a communication device of the user's preference. Automated mechanisms are provided to send feedback information on the broadcast content to Multiple System Operators (MSOs) and broadcasters from the end-user device.

The present disclosure describes contiguous content streams that comprise of segments which are disparate in a logical and semantic sense. However, in prior art, there is no stream level demarcation (e.g., by means of defined markers) of such segments. An illustrative and non-limiting example of a segment or "macro segment" as envisioned in this invention is the audio-video content associated with one product in a home shopping channel. The audio-video content associated with the immediately next product that follows in the same contiguous stream of this channel would form the next segment. The contiguous nature of the stream would, in prior art, provide no notion of demarcation of the two segments. However, for any human viewer, the two segments are semantically or logically distinct. This invention allows a content creator or MSO operator to predefine such segments and the boundaries between such segments. A further illustrative example of such a segment is the audio-video content associated with one joke or routine in a comedy monologue that includes a plurality of such jokes or routines. A contiguous audio stream which contains song after song, with no demarcation between the songs in prior art, also can be considered to exemplify the notion of a segment. Each song (which is logically or semantically distinct to an end-user) forms a segment in this example.

It should be noted that since the notion of a segment has been conceptualized by this disclosure based on a logical or semantic entity, such a notion of segment operates at a 'macro' level, compared to, say, prior art which may have the wherewithal to operate on more 'micro' level entities such as every MPEG packet, every GOP, fixed time increments, every scene change, or every reference frame.

Figure 1:
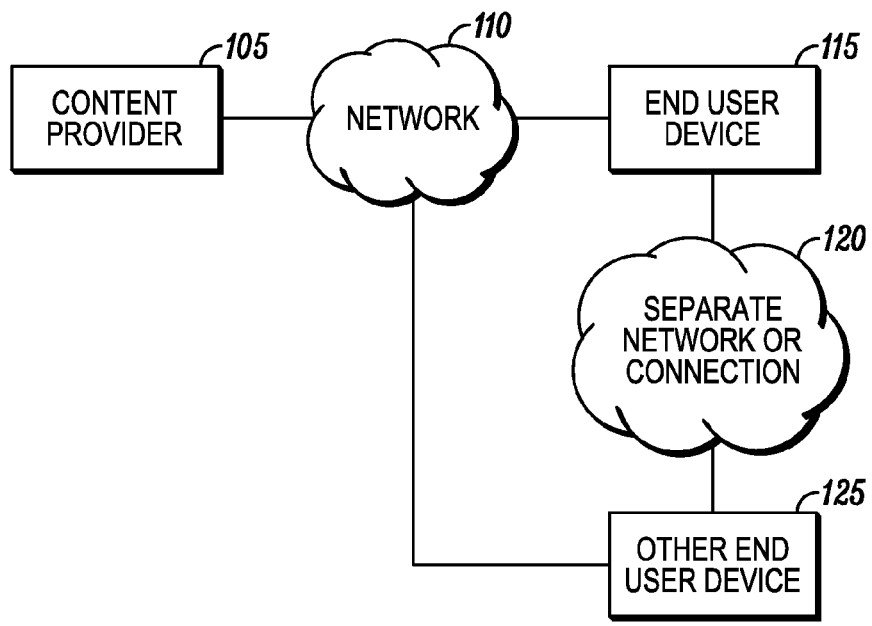
FIG. 1 illustrates an exemplary system 100 for streaming or broadcasting media content according to one embodiment.

FIG. 1 illustrates an exemplary system 100 for streaming or broadcasting media content. Content provider 105 streams media content via network 110 to end-user device 115. Content provider 105 may be a headend, e.g., of a satellite television system or Multiple System Operator (MSO), or a server, e.g., a media server or Video on Demand (VOD) server. Network 110 may be an internet protocol (IP) based network. Network 110 may also be a broadcast network used to broadcast television content where content provider 105 is a cable or satellite television provider. In addition network 110 may be a wired, e.g., fiber optic, coaxial, or wireless access network, e.g., 3G, 4G, Worldwide Interoperability for Microwave Access (WiMAX), High Speed Packet Access (HSPA), HSPA+, Long Term Evolution (LTE). End user device 115 may be a set top box (STB), personal digital assistant (PDA), digital video recorder (DVR), computer, or mobile device, e.g., a laptop, netbook, tablet, portable media player, or wireless phone. In addition, end user device 115 may communicate with other end user devices 125 via a separate wired or wireless connection or network 120 via various protocols, e.g., Bluetooth, Wireless Local Area Network (WLAN) protocols. End user device 125 may comprise similar devices to end user device 115 and may also receive information from content provider 105 via network 110. End user devices 115,125 may be owned by the same user. In addition, end user device 115 and end user device 125 may be owned by different users.

In one embodiment, broadcast network, e.g., network 110 streams media content, e.g., an MPEG2 transport stream containing segmented and tagged audio and video streams, from content provider 105. In this embodiment, the receiving device, e.g end user device 115 may be a set top box.

Information is provided in the broadcast content or previously stored content, so that logically disparate portions of the content, e.g., media content, can be extracted from a contiguous program and stored as discrete content files, e.g., in a database of end user device 115, 125.

Each segment of a given program corresponds to a tag with a unique data set associated with that segment. The broadcast content is filtered using automated methods to extract segments of interest from a given program. In one embodiment, the filtering happens on live broadcasts where the content can be monitored and logically distinct portions of the broadcast that are of interest to a user of end user device 115 can be recorded and stored in an automated fashion.

In another embodiment, logical segments within a previously recorded stream can be indexed and stored in a database. This indexing and storing can be accomplished either by content provider 105 or end-user device 115. In one embodiment, the user can use the database to "browse" through the indexed and stored content. In one embodiment, when the indexing and storing occurs at content provider 105, MSOs can provide "drops" to users who are interested in a certain assortment of logical segments.

A database of recordings is created where objects, e.g., content objects constituting the individual component media snippets, e.g., logically disparate segments of media content, from different programs along with the information associated with each snippet is stored in an indexed fashion. As stated previously, the database may either be implemented at content provider 105 or end-user device 115. Sorting of objects in the database can be done based on different criteria. Retrieval of database content objects (e.g., media content objects or media snippets) from storage can be done based on a plurality of search criterion.

Having an organized database on one's set-top enables interworking with other devices like mobiles or portable media players. With both set-tops and other mobile devices supporting communication interfaces such as blue-tooth, one can transfer media objects and metadata from the set-top to a mobile device. DRM restrictions will have to be considered and the restrictions on individual snippets may have to be derived from that of the macro program. Several interesting applications are enabled by this disclosure. For example, selected songs may be transferred to portable media players easily. Where previously one would have had to manually edit long recordings to extract songs, a user can now just select and transfer. Using a home shopping example, if contact numbers can be transmitted to a mobile phone, the user can then make a call without having to jot down and dial the number. Lastly, product details may easily be sent to the user's email address for later reference.

In one embodiment, each segment of media content has a unique standardized tag with a corresponding associated data set. As such there is no duplication of media objects in the database even in cases where the same media object/segment occurs in different programs that get recorded.

The present disclosure enables social networking while watching broadcasts like shopping channels or music channels. This social networking aspect may be subject to DRM restrictions.

In one embodiment, friends can share media snippets, e.g., one or more filtered segments or metadata, e.g., a tag and/or an associated data set. Sharing of the media snippet may be subject to DRM restrictions. For example, in the home shopping example, a user can ask a friend to help choose between one of two choices of products (where the products are described using a media segment and/or a tag and its associated data set, e.g., category, price, etc.), thus making the shopping a social activity.

Users can also share only the metadata associated with the snippet of interest without sharing the content itself. For example, if both user1 and user2 have recorded the content, user1 only needs to send the index/metadata associated with the content and user2 can locate the same content in the local recording at user2's end user device since each snippet will have a unique tag.

Buddy groups can be automatically formed based on user preferences for filtering. For example, people who have indicated that they want to record jazz can automatically be included in a buddy group of jazz lovers.

Users who would like to create a blog can upload certain media objects or metadata associated with the blog from the database in their set-tops.

In one embodiment, the database objects comprise individual snippets filtered from a contiguous program, e.g., the macro program. The database objects may have a ratings column along with the other associated metadata. The ratings column can be synched to a certain server that provides rating information on the different products/songs. In one embodiment, the user can share the filtered media content, e.g., media content object, and/or the specifications associated with it, with friends. In one embodiment, sharing is subject to Digital Rights Management (DRM) restrictions.

End-user device 115 may share information with another end-user device 125 via separate network or connection 120. In one embodiment, the user may receive the information associated with the individual components of the content object on other devices 125, for example a mobile phone, directly from content provider 105, e.g., via network 110.

In one embodiment, end user devices 115, 125 may automatically provide feedback information on the broadcast program to content provider 105. In one embodiment, feedback information conveyed to the broadcasters, e.g., content provider 105, may be popularity of different segments of the same program. User inputs may be used to derive information regarding user interests. Users may specify how programs are to be filtered. This user preference information may automatically be used to provide feedback on what specific categories are of interest to the users.

Ratings of popularity of broadcast events are of interest to viewers, broadcasters, and advertisers. Measurement systems like the Nielsen ratings exist to cater to this aspect. It should be noted that such measurement systems require dedicated hardware installation and cooperation from the participants. Information on ratings (similar to Nielsen's systems) can be provided with the added advantage of being quick, and easy to deploy and adopt. Further, feedback is provided at a more granular level where the viewer's preference of different segments within the program is to be measured. This feedback information may be presented to the viewers as well as the content providers. A viewer can instantaneously be provided with a real time popularity rating of the content being watched by the viewer's social network.

The popularity ratings can easily be obtained by having counters on each of the shows being monitored/viewed/recorded. This can be used in conjunction with various aspects of a user database that are available to the operator, like demographic information. The feedback information provided by the present disclosure may be provided in real time. Feedback on user preferences of segments of the programs can be used dynamically by content providers to provide more popular categories. Real-time ratings can be used by viewers to "see what's latest" during ongoing broadcast of the programming, e.g., media content.

Figure 2:
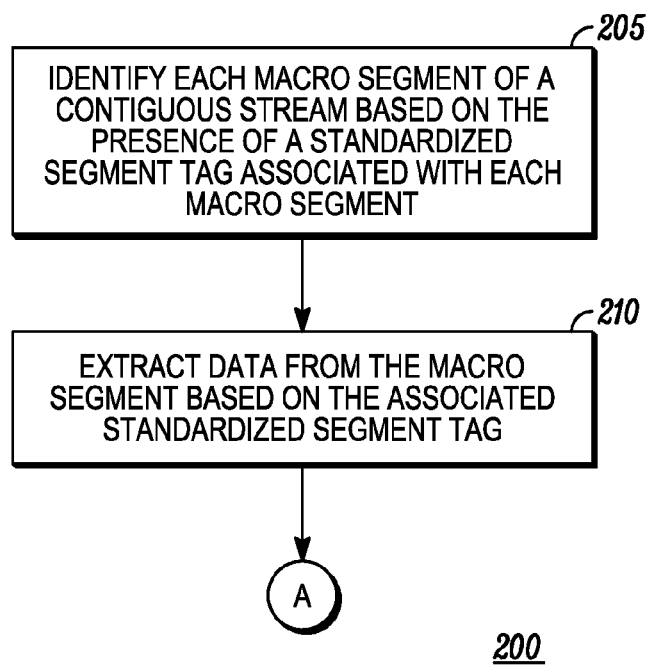
FIG. 2 illustrates a method 200 for extracting segments from media content according to one embodiment.

FIG. 2 illustrates a method 200 for extracting segments from media content. The media content may be a contiguous stream. The contiguous stream may be comprised of a plurality of logically disparate macro segments. At step 205, each macro segment of the contiguous stream is identified based on the presence of a standardized tag associated with each macro segment. At step 210, data is extracted from the macro segment based on the associated standardized segment tag.

Unlike typical metadata, which is often in the form of free flowing comments or text, the present disclosure uses standardized tags for each logically disparate segment, where the notion of the same standardized tag is commonly shared by the stream/content creator and the content consumer/end device for the same segment. As an extension of this concept of standardized tags with respect to music or music videos, the same song, for instance in different program streams, could use the same standardized tag. Such standardized tags need not be limited to alphanumeric/text characters alone. In one embodiment, standardized audio tags may be used. Standardized tags help in searches and de-duplication of segments stored in content objects generated from different programs.

The use of standardized tags helps in automated searches, which can be across multiple programs. In addition, the use of standardized tags can also help in de-duplication, e.g., preventing the saving of duplicate data in a database.

In one embodiment, a device 105, 115, 125 filters media content to determine whether a tag associated with a segment of media content matches user preference data. The media content to be filtered may be a live broadcast, a recorded program, or content stored in a database at the MSO.

In one embodiment, the media content comprises a live broadcast. Users can specify desired channels and content in which the viewer has an interest. To enable the user to specify the channel of interest and content/product category of choice, an interface is provided for the user to input preferences. This can be implemented as a set of on-screen options.

For each content type corresponding to a content specifier in the metadata field for that content, the application may have separate user entry fields. During initialization or set-up, the user may enter preferences to mark the categories and the channels that are of interest. End user device 115, e.g., set-top, always checks the user preference. If at least one category is requested, the set-top tunes to the selected channel/channels and monitors the stream for the user's preference and initiates recordings accordingly. The recording is stopped when a new segment is encountered, unless that is also one preferred by the user. Many set-tops come with multiple tuners and this monitoring and recording may be achieved in the background even if the user is watching other programs.

In one embodiment, the media content comprises recorded programs. Media content may be recorded in response to scheduling, either automatically or manually by a user. When the user schedules a recording of an entire program, this program may be filtered and organized in a database. The filtering is based on the user's preferences. The user would then be able to browse and watch those segments that are of interest.

In one embodiment, the media content is content stored in a database at the MSO. MSOs may create tailored content that can be used for VOD like services, just by concatenating specific assortments of the media snippets, e.g., segments. For example, a viewer may send a request to an MSO for a specific assortment of classical music videos. The MSOs can retrieve the streams from a database and send it to the user. There can be differential charges for services of this type.

Figure 9:
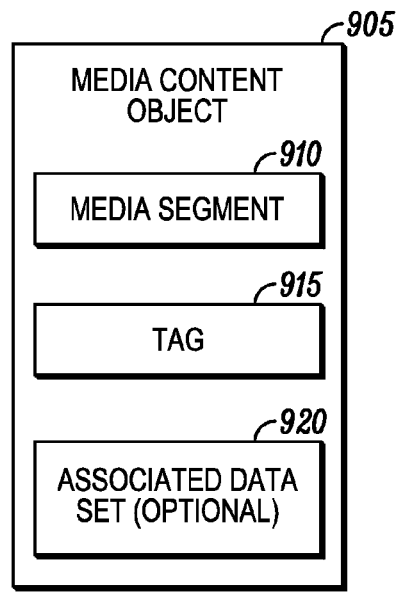
FIG. 9 illustrates a media content object 905 according to one embodiment.

In one embodiment, a content object, e.g., media content object, is created by device 105, 115. The content object comprises at least the tag and the associated segment. The content object may be saved in a database at content provider 105 or end user device 115. In one embodiment, the content object is created by the device 105, 115 when the tag matches user preference data. FIG. 9 illustrates a media content object 905 according to one embodiment. Media content object includes media segment 910, tag 915, and optional associated data set 920.

The present disclosure enhances the user experience for programs that are essentially a concatenation of assorted logical units that are telecast as a single program. A home shopping channel and a music channel (either audio or a channel featuring music videos) are two examples that illustrate how the user experience for programs may be enhanced using the present disclosure.

Methods described in the present disclosure may be used to classify segments of previously un-demarcated content, e.g., music channels. Many channels air song after song in their programs. Each song is not demarcated or classified (for instance, based on genre, artist, label, etc.) for recording (wherever permitted by DRM). Often, users record a complete program consisting of several songs aired consecutively. Using methods of the present disclosure, a facility for splitting, labeling and indexing of individual songs/tracks that are recorded from continuous audio-streams by end users is possible.

Appropriate information at the stream level is incorporated, and subsequently, such information is used for splitting, labeling and indexing of constituent tracks recorded from the program. Even in cases where recording is not permitted, the information about each logical segment or macro segment incorporated in the stream by the invention allows for users to inquire about purchase information of individual songs of a program which, perhaps, has a mix of songs from several albums. The content stored or the metadata associated with the content can also be shared with other users by networking the receiving device. Social networking groups can be formed with people who have like-minded taste with respect to music. These and other user experiences are enabled by the present disclosure.

Another example of an "un-demarcated" program is home shopping channel content. This content is generally aired by some channels in a long contiguous stream wherein the constituent products or categories are not demarcated as separate programs or any other granular logical segments. Since scheduling of recordings based on constituent logical segments is not possible in the prior art, the end-user who cannot watch the live-program, may be forced to record long streams and later peruse these manually to determine portions of interest. Recording of the entire home shopping channel content, does not lend itself easily to search among product categories of his choice, or to get all the required product specifications in a medium of his choice.

The present disclosure enables a viewer to be able to select those categories of products of interest and the receiving device, e.g., end-user device 115, can record and store snippets, e.g., segments, related to only those products in a database (wherever permitted by DRM). This database can then be browsed at leisure and may be searched based on price or other specifications for the products of choice. The shopping experience can be further enriched by having details like phone numbers directly streamed to a mobile for the user to make the purchase, rather than having to jot down the number and then make a call. As is explained in the later, other enhanced user experiences like sharing product specifications with friends and taking their opinions, or requesting special drops from MSOs for specific product category are enabled by the present disclosure.

Figure 3:
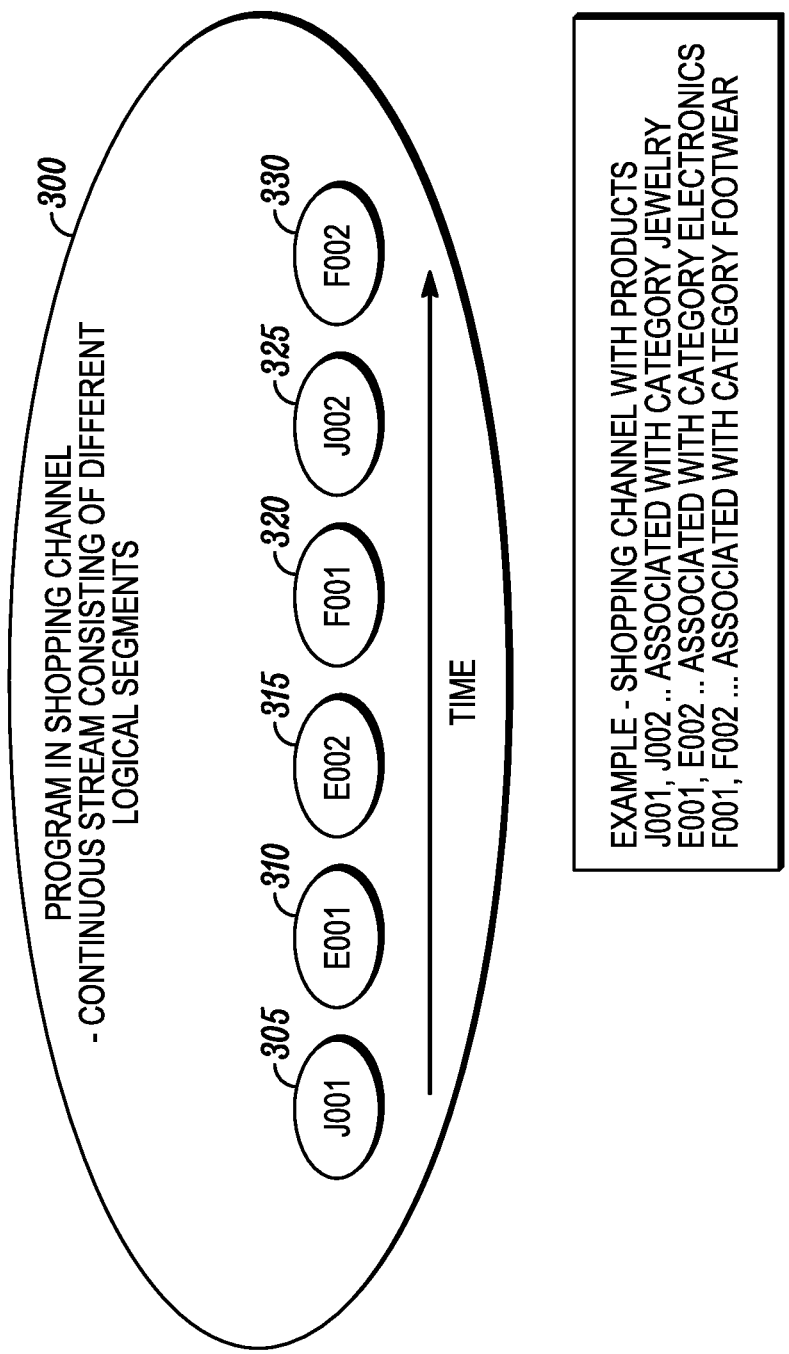
FIG. 3 illustrates a contiguous broadcast 300 of home shopping content according to one embodiment.

FIG. 3 illustrates a contiguous broadcast 300 of home shopping content consisting of different products. Tags are associated with segments of media content. One of the enhancements provided by this disclosure is the ability to tag logically disparate snippets, e.g., segments, within any given program. In the context of a shopping channel, the logically disparate segments may be the media content related to a single product. FIG. 3 shows how the single shopping program may contain multiple products of different categories that are aired continuously one after the other. In this example, a shopping channel comprises a continuous stream of different logical segments. Each logical segment has a corresponding tag (J001, E001, E002, F001, J002, F002 . . . ). Tags J001, 305 and J002, 325 are segments having the category "jewelry". Tags E001, 310 and E002, 315 are segments having the category "electronics". Tags F001, 320 and F002, 330 relate to segments having the category "footwear".

Figure 4:
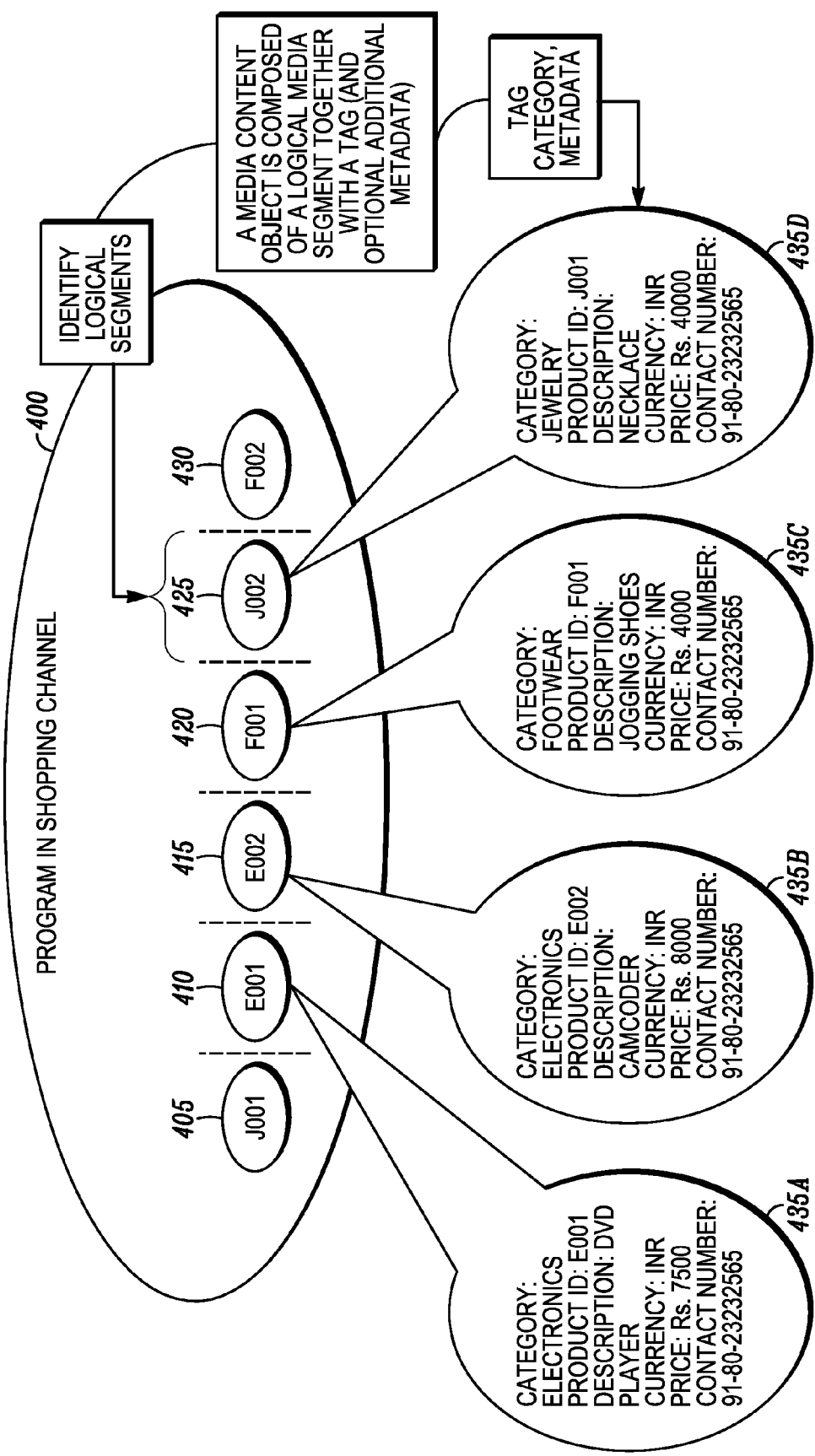
FIG. 4 illustrates tagging of individual segments of a continuous broadcast stream 400 according to one embodiment.

FIG. 4 illustrates tagging of individual segments of a continuous broadcast channel. With respect to a home shopping broadcast, each product is typically associated with a product ID, product category, price, contact number for purchase, etc. Traditionally this data is normally sent as part of the video stream, in a form that can only be "seen" by a user who is actively watching the program (either live or stored). The present disclosure allows this information to be "recognized" by an automated system. FIG. 4 shows how each product is effectively tagged and described by an associated data-set by tagging individual segments of the video stream 400. Each logical segment is identified by a corresponding tag (J001, E001, E002, F001, J002, F002 . . . ). Tags J001, 405 and J002, 425 are segments having the category "jewelry". Tags E001, 410 and E002, 415 are segments having the category "electronics". Tags F001, 420 and F002, 430 relate to segments having the category "footwear". Each tag has an associated data, 435A, 435B, 435C, 435D set that includes: Category, Product ID, Description, Currency, Price, and Contact Number.

Figure 5:
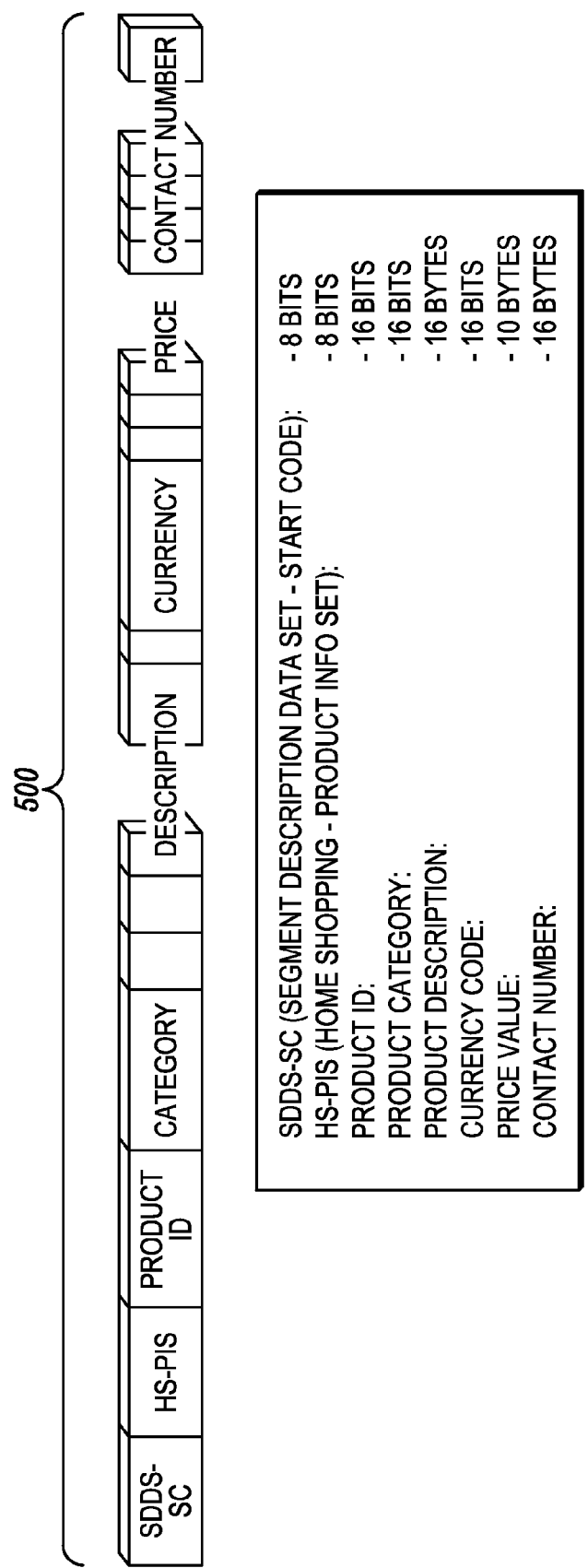
FIG. 5 illustrates a segment description data set 500 according to one embodiment.

FIG. 5 illustrates a segment description data set. Tagging may be done in different ways. An exemplary method is as follows. Most TV broadcasts currently stream multimedia content in MPEG2 format. MPEG2 video format provides an option to add non-video data in the form of "user data". User data can be inserted on three levels: the sequence level; the group of pictures (GOP) level; and the picture data level.

At the picture level, this is referred to as picture user data. Picture User Data is carried on each frame of the video sequence and may contain information associated with that frame. This frame level association is useful to mark out sections of a program, without having to reference the program from any point outside that section.

The picture user data can thus be one option to transmit user data information. The picture user data has a unique start-code, and can be followed by any number of 8-bit words. The data associated with each segment can be organized in a single block referred to as Segment Description Data Set or SDDS.

The SDDS set can be standardized for a given content type and one of the fields in the SDDS would have a unique code to represent the content type. FIG. 5 shows one way of defining SDDS 500 that can be transmitted for example in picture user data. In this example the SDDS fields are defined for a product shown in a home shopping channel. The Segment Description Data Set-Start Code (SDDS-SC) has a size of 8 bits. The Home Shopping-Product Information Set (HS-PIS) has a size of 8 bits. The Product ID, Product Category, and Currency Code each have a size of 16 bits. The Product Description and Contact Number each have a size of 16 bytes. The Price Value has a size of 10 bytes. The unique code "HS-PIS" indicates a Home Shopping-Product Information Set. The other fields are related to the product to be sold that would be of interest to the viewer.

While the above description specifies how Picture User Data can be used for MPEG2 video streams, this is by no means the only manner in which this information can be sent along with the media content. For MPEG4 AVC streams there is an option of sending such data in the bitstream, in the SEI (Supplemental Enhancement Information). For MPEG2 TS streams, private data streams may be used to send information along with media content. The .mp4 container format has an option of having private data streams in which information can be embedded. The example we described with the Picture User Data is only an exemplary implementation of the present disclosure.

To conceptualize and embody aspects of the present disclosure, this disclosure has provided examples of how appropriate tagging information can be incorporated into MPEG2 and MPEG4 streams. One having skill in the art would understand that the present disclosure would also apply to appropriate descriptors for MPEG7 and MPEG21, and future iterations of MPEG-related standards.

Figure 6:
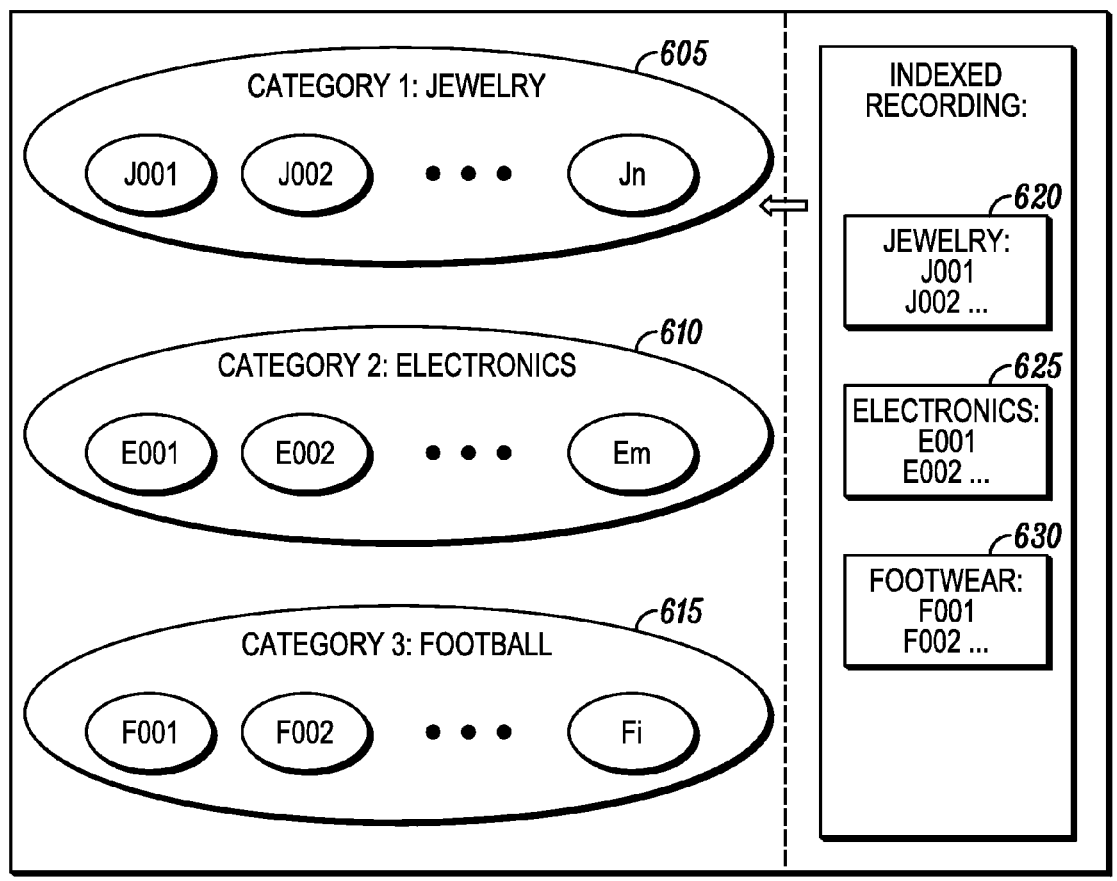
FIG. 6 illustrates organization of home shopping content recordings according to one embodiment.

FIG. 6 illustrates organization of home shopping content recordings. Recordings of snippets, e.g., segments, that are tagged, readily lend themselves to being stored in a database structure. Considering the exemplary tagging system described in FIG. 5, the different fields in the SDDS, along with the media snippet will constitute one database object. The SDDS will have a one-to-one mapping with the media snippet and hence duplicate recordings of the same segments can be discarded. Since each program may mix media objects/segments differently, the same media object/segment may occur in different programs in different contexts, i.e. along with a different set of other media segments. The present disclosure guarantees that there is no duplication even in cases where multiple programs containing the same media object are recorded.

The database provides a means to sort and search for media content based on any of the fields of the SDDS. For example, referring to the home shopping example, products are organized in different categories that can further be sorted based on price, description, etc., all of which are the different fields of an SDDS of type HS-PIS (Home Shopping-Product Info Set) which will be associated with home-shopping channels. Similarly, for example, with respect to music channels, media content objects would have a standard associated SDDS type having fields like genre, artist, album, etc., which can be used for classifying the database. A simplified illustration in the home shopping context is shown in FIG. 6. In FIG. 6, media segments may be indexed by product category, e.g., Jewelry 605, Electronics 610, Footwear 615. Content objects related to jewelry 620 are characterized by tags J001, J002, . . . , Jn along with a media segment corresponding to each tag. Content objects related to electronics 625 are characterized by tags E001, E002, . . . , Em along with a media segment corresponding to each tag. Content objects related to footwear 630 are characterized by tags F001, F002, . . . , Fi along with a media segment corresponding to each tag.

The processes described above, including but not limited to those presented in connection with FIGS. 2-6, may be implemented in general, multi-purpose or single purpose processors. Such a processor will execute instructions, either at the assembly, compiled or machine-level, to perform that process. Those instructions can be written by one of ordinary skill in the art following the description of presented above and stored or transmitted on a computer readable medium, e.g., a non-transitory computer-readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

Figure 7:
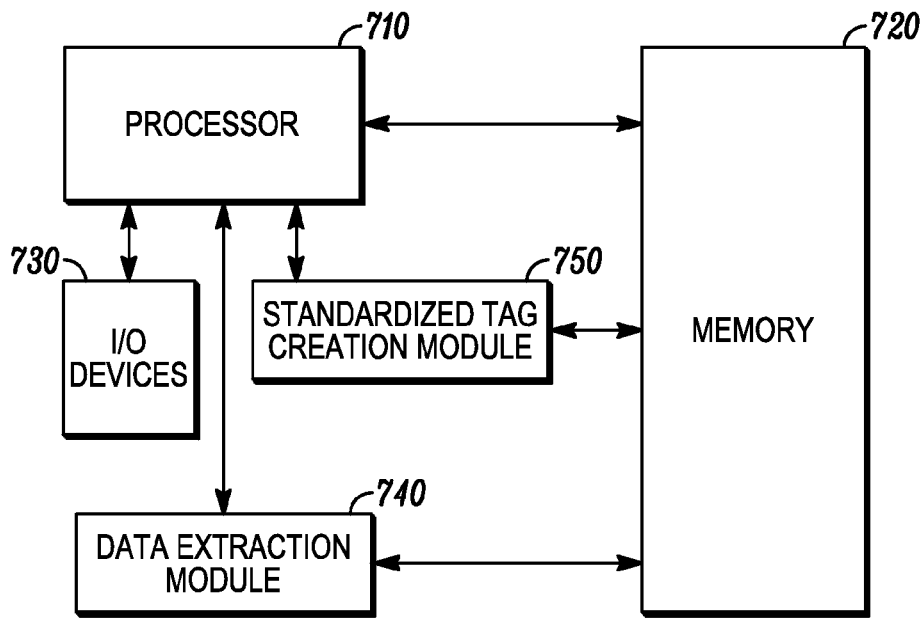
FIG. 7 illustrates a block diagram of an example device 700 according to one embodiment.

FIG. 7 illustrates a block diagram of an example device 700. Specifically, device 700 can be employed to extract segments of media content. Device 700 may be implemented in content provider 105 or end user device 115, 125.

Device 700 comprises a processor (CPU) 710, a memory 720, e.g., random access memory (RAM) and/or read only memory (ROM), a data extraction module 740, standardized tag creation module 750, and various input/output devices 730, (e.g., storage devices, including but not limited to, a tape drive, a floppy drive, a hard disk drive or a compact disk drive, a receiver, a transmitter, and other devices commonly required in multimedia, e.g., content delivery, system components, Universal Serial Bus (USB) mass storage, network attached storage, storage device on a network cloud). In one embodiment, data extraction module 740 stores extracted data in an indexed database resident in memory 720. In one embodiment, standardized tag creation module 750 stores each segment of a contiguous stream and the standardized segment tag associated with each segment in memory 720.

It should be understood that data extraction module 740 and standardized tag creation module 750 can be implemented as one or more physical devices that are coupled to the CPU 710 through a communication channel. Alternatively, data extraction module 740 and standardized tag creation module 750 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 720 of the computer. As such, data extraction module 740 and standardized tag creation module 750 (including associated data structures) of the present invention can be stored on a computer readable medium, e.g., RAM memory, magnetic or optical drive or diskette and the like.

Figure 8:
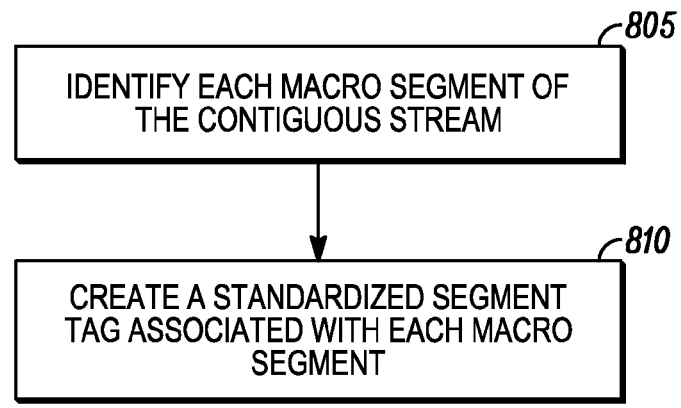
FIG. 8 illustrates a method 800 for creating information in media content according to one embodiment.

FIG. 8 illustrates a method 800 for creating information in media content according to one embodiment. The media content may be defined by a contiguous stream. The contiguous stream may have a plurality of logically disparate macro segments. The contiguous stream may be an audio-video stream, an audio-only stream, or a video-only stream. At step 805, each macro segment of the contiguous stream is identified. At step 810, a standardized segment tag associated with each macro segment is created. In one embodiment, method 800 may be performed by standardized tag creation module 750.

In one embodiment, the standardized segment tag comprises user data. The user data may be inserted at a sequence level of the media content, a group of pictures (GOP) level of the media content, or a picture data level of the media content.

In one embodiment, using MPEG4 AVC streams, the standardized segment tag data may be sent in the bitstream. In this embodiment, the tag may be inserted in SEI (Supplemental Enhancement Information).

In one embodiment, the standardized segment tag may be included in MPEG2 TS streams. In this embodiment, private data streams may be used to send tag information along with media content.

In one embodiment, the standardized segment tag may be included in audio data. In this embodiment, the standardized segment tag may be an ID3 audio tag. ID3 is a metadata container most often used in conjunction with the MP3 audio file format. The ID3 tag allows information such as the title, artist, album, track number, and other information about the file to be stored in the file itself.

Content creators may inject information, e.g., standardized tag information unique to the segment, in a stream before it is broadcast. Content creators are typically responsible for one or more of the following: 1) Capturing media content using capture devices such as camera and microphones; 2) Encoding media content; 3) Generating and grooming program streams which could potentially multiplex different channels of media content. In many cases content copy right could vest with content creators.

Figure 10:
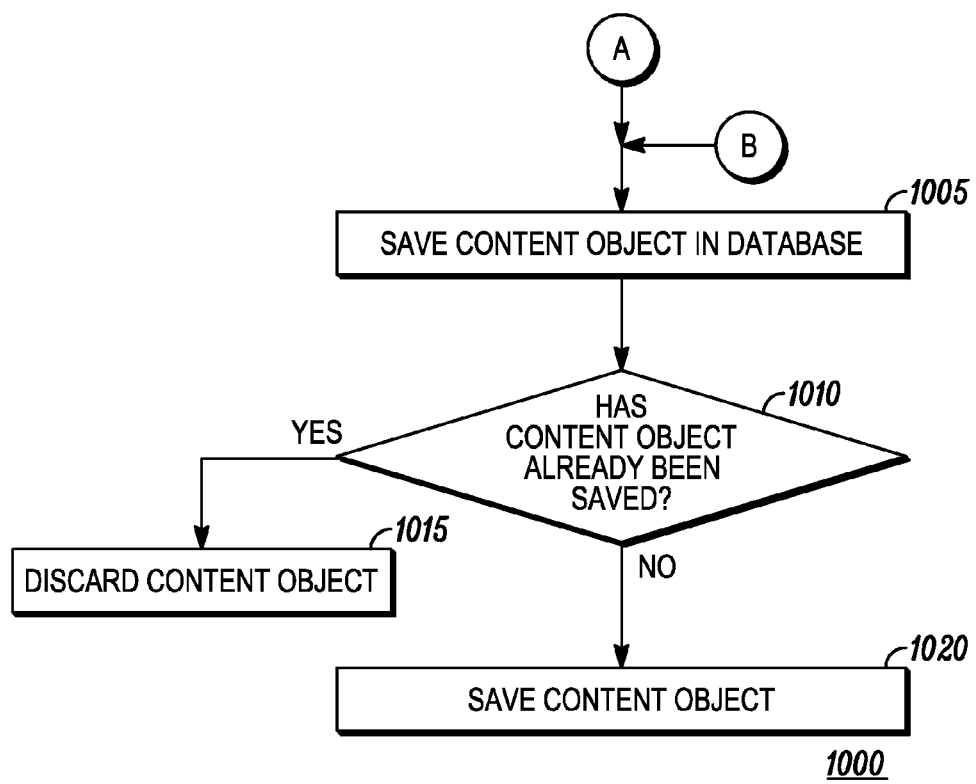
FIG. 10 illustrates a method 1000 for saving a content object in a database.

FIG. 10 illustrates a method 1000 for saving a content object in a database. At step 1005, a device, e.g., content provider 105 or end user device 115, receives a command, e.g., from data extraction module 740, to save the content object in a database. The command to save the content object may be initiated once the content object has been identified based on user preferences or after a user decides not to share the content object(s) or tag(s) with additional users. At step 1010, a determination is made as to whether the content object has already been saved in the database. If the content object has already been saved in the database, the present content object is discarded at step 1015. If the content object has not already been saved in the database, the content object is saved in the database at step 1020.

Figure 11:
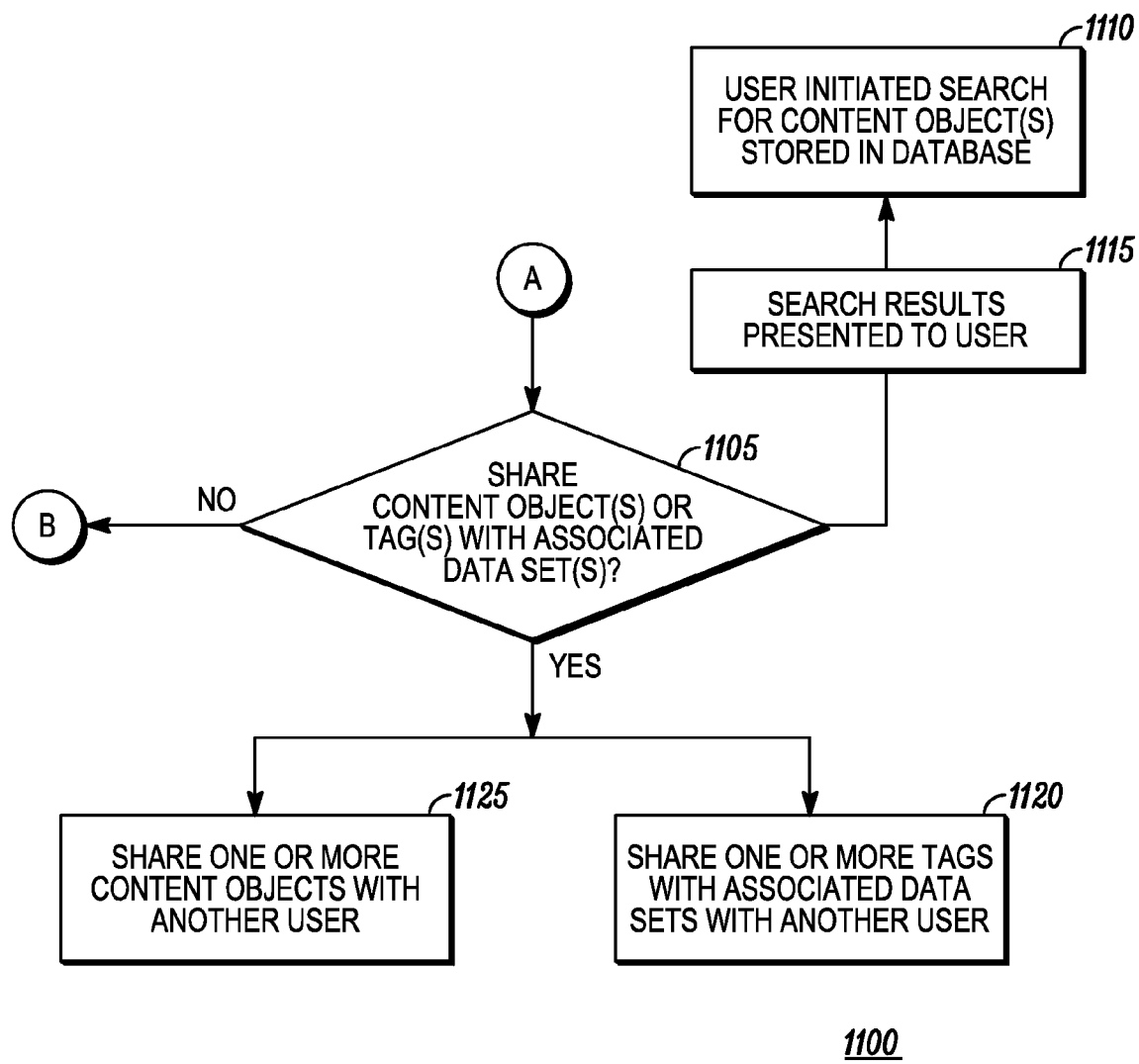
FIG. 11 illustrates a method 1100 for sharing a content object.

FIG. 11 illustrates a method 1100 for sharing a content object. At step 1105, a determination is made as to whether content object(s) or tag(s) with associated data set(s) are desired to be shared by the user with another user. Step 1105 may be initiated once the content object(s) has been identified using user preference data. Step 1105 may also be initiated after a user searches for content objects stored in the database (at step 1110) and the search results are presented to the user (at step 1115). If the user desires to share only tag(s) with associated set(s) with another user, this is performed at step 1120. If the user desires to share content object(s) with another user, this is performed at step 1125. If the user does not wish to share content object(s) or tag(s) with associated data set(s), the user may be prompted to save the content object(s) if the content object(s) have not already been stored in the database.

Advantages of the present disclosure include, but are not limited to, the following: 1) Standardized tags are used: Automated mechanisms for filtering content allow for efficient searching/filtering of content; 2) Inter-program search: searching for given content across different programs is enabled; and 3) Duplication of content recording is avoided: Different assortments of various segments of a program are often re-telecast in different programs. The present disclosure ensures that only one object will be recorded (as such, there is no duplication).

While the foregoing is directed to embodiments of the present invention, other and further embodiments of the invention may be devised without departing from the basic scope thereof, and the scope thereof is determined by the claims that follow.

What is claimed is:

1. A method for creating information in media content carried out by an apparatus that provides the media content, the media content defined by a contiguous stream, the contiguous stream having a plurality of logically disparate macro segments, the method comprising:
    identifying one or more macro segments of the contiguous stream before any of the one or more macro segments are presented to a user;
        creating a standardized segment tag associated with each of the one or more macro segments within picture user data before any of the one or more macro segments are presented to the user;
    associating a data set with the standardized segment tag, the data set comprising a plurality of types of information associated with a respective macro segment associated with the standardized segment tag; and
    providing the data set associated with the standardized segment tag within the picture user data as a Segment Description Data Set comprising one or more fields, each of the one or more fields comprising information associated with the respective macro segment.

2. The method according to claim 1, wherein the contiguous stream comprises one of: an audio-video stream, an audio-only stream, a video-only stream.

3. The method according to claim 1, wherein the contiguous stream comprises broadcast content.

4. The method according to claim 1, further comprising:
    creating the standardized segment tag in media data within Supplemental Enhancement Information.

5. The method according to claim 1, further comprising:
    creating the standardized segment tag in media data within a private data stream.

6. The method according to claim 1, further comprising:
    creating the standardized segment tag in media data in an ID3 audio tag.

7. The method according to claim 1, wherein the creation of the standardized segment tag in media content is performed by a content creator.

8. The method according to claim 1, wherein the creation of the standardized segment tag in media content is performed by a multiple system operator (MSO).

9. A method for extracting segments from media content carried out by an apparatus that receives the media content, the media content defined by a contiguous stream, the contiguous stream having a plurality of logically disparate macro segments, the method comprising:
- identifying one or more macro segments of the contiguous stream based on the presence of a standardized segment tag that has been associated with each macro segment before any of the one or more macro segments are presented to a user, the standardized segment tag associated with a macro segment being created within picture user data;
- extracting data from each identified macro segment based on the associated standardized segment tag;
- creating a content object, the content object comprising at least the standardized segment tag and the associated macro segment, wherein the content object further comprises a data set associated with each identified macro segment, the data set comprising a plurality of types of information associated with the identified macro segment; and
- providing the data set associated with the standardized segment tag within the picture user data as a Segment Description Data Set comprising one or more fields, each of the one or more fields comprising information associated with the respective macro segment.

10. A method for extracting segments from media content carried out by an apparatus that receives the media content, the media content defined by a contiguous stream, the contiguous stream having a plurality of logically disparate macro segments, the method comprising:
- identifying one or more macro segments of the contiguous stream based on the presence of a standardized segment tag that has been associated with each macro segment before any of the one or more macro segments are presented to a user, the standardized segment tag associated with a macro segment being created within picture user data;
- extracting data from each identified macro segment based on the associated standardized segment tag, wherein each standardized segment tag is associated with a data set, the data set comprising a plurality of types of information associated with the identified macro segment; and
- providing the data set associated with the standardized segment tag within the picture user data as a Segment Description Data Set comprising one or more fields, each of the one or more fields comprising information associated with the respective macro segment.

11. The method according to claim 10, wherein one or more standardized segment tags and data sets associated with each standardized segment tag are shared with one or more users.

12. A device for creating information in media content, the media content defined by a contiguous stream, the contiguous stream having a plurality of logically disparate macro segments, the device comprising:
- a processor configured to:
  - identify one or more macro segments of the contiguous stream before any of the one or more macro segments are presented to a user;
  - create a standardized segment tag associated with each of the one or more macro segments within picture user data before any of the one or more macro segments are presented to the user;
  - associate a data set with the standardized segment tag, the data set comprising a plurality of types of information associated with a respective macro segment associated with the; standardized segment tag; and
  - provide the data set associated with the standardized segment tag within the picture user data as a Segment Description Data Set comprising one or more fields, each of the one or more fields comprising information associated with the respective macro segment; and
- a memory for storing the one or more macro segments and the standardized segment tag associated with each of the one or more macro segments.

13. A method for extracting segments from media content carried out by an apparatus that receives the media content, the media content defined by a contiguous stream, the contiguous stream having a plurality of logically disparate macro segments, the method comprising:
- identifying one or more macro segments of the contiguous stream based on the presence of a standardized segment tag that has been associated with each macro segment before any of the one or more macro segments are presented to a user, the standardized segment tag associated with a macro segment being created within picture user data;
- extracting data from each identified macro segment based on the associated standardized segment tag;
- creating a content object, the content object comprising at least the standardized segment tag and the associated macro segment, wherein one or more standardized segment tags and data sets associated with each standardized segment tag are shared with one or more users and wherein each of the one or more data sets comprises a plurality of types of information associated with a respective macro segment associated with a respective standardized segment tag; and
- providing the data set associated with the standardized segment tag within the picture user data as a Segment Description Data Set comprising one or more fields, each of the one or more fields comprising information associated with the respective macro segment.

* * * * *